(12) United States Patent
Goettfert et al.

(10) Patent No.: US 7,764,789 B2
(45) Date of Patent: Jul. 27, 2010

(54) KEY BIT STREAM GENERATION

(75) Inventors: Rainer Goettfert, Putzbrunn (DE);
Berndt Gammel, Markt Schwaben (DE); Kalman Cinkler, Munich (DE);
Stefan Rueping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 1130 days.

(21) Appl. No.: 11/073,018

(22) Filed: Mar. 4, 2005

(65) Prior Publication Data
US 2005/0220297 A1    Oct. 6, 2005

(30) Foreign Application Priority Data
Mar. 4, 2004    (DE)    .................. 10 2004 010 666

(51) Int. Cl.
*H04L 9/18* (2006.01)
*H04L 9/28* (2006.01)
*H04K 1/10* (2006.01)

(52) U.S. Cl. .................. 380/44; 380/28; 380/37; 380/43; 380/265; 380/278

(58) Field of Classification Search .......... None
See application file for complete search history.

(56) References Cited

U.S. PATENT DOCUMENTS

| | | | |
|---|---|---|---|
| 5,060,265 A | 10/1991 | Finkelstein | |
| 5,446,683 A * | 8/1995 | Mullen et al. | 708/256 |
| 5,535,277 A | 7/1996 | Shibata et al. | |
| 6,330,333 B1 * | 12/2001 | Mizikovsky et al. | 380/207 |
| 6,560,338 B1 * | 5/2003 | Rose et al. | 380/47 |
| 2004/0049525 A1 * | 3/2004 | Hars | 708/250 |

FOREIGN PATENT DOCUMENTS

| | | |
|---|---|---|
| DE | 1 207 426 | 12/1965 |
| JP | 9-325881 A | 12/1997 |
| JP | 2000-242470 A | 9/2000 |
| WO | WO-00/46954 A1 | 8/2000 |

OTHER PUBLICATIONS

Chan, Chi-Kong et al.; "Design of keystream generator"; Electronics Letters, vol. 34, issue 12, published Jun. 11, 1998, pp. 1206-1207.
Zeng, K. et al.; "Pseudorandom bit generators in stream-cipher cryptography"; Computer, vol. 24, issue 2, published Feb. 1991, pp. 8-17.

* cited by examiner

*Primary Examiner*—Nasser Moazzami
*Assistant Examiner*—Fatoumata Traore
(74) *Attorney, Agent, or Firm*—Dickstein, Shapiro, LLP.

(57) ABSTRACT

A bit sequence which is generated by a feedback shift register is decimated with a variable decimation value m (m∈N) in a predetermined manner which is known on the decryption side, i.e. in that every $m^{th}$ bit of the bit sequence is picked out from the bit sequence so as to obtain the key bit stream.

33 Claims, 6 Drawing Sheets

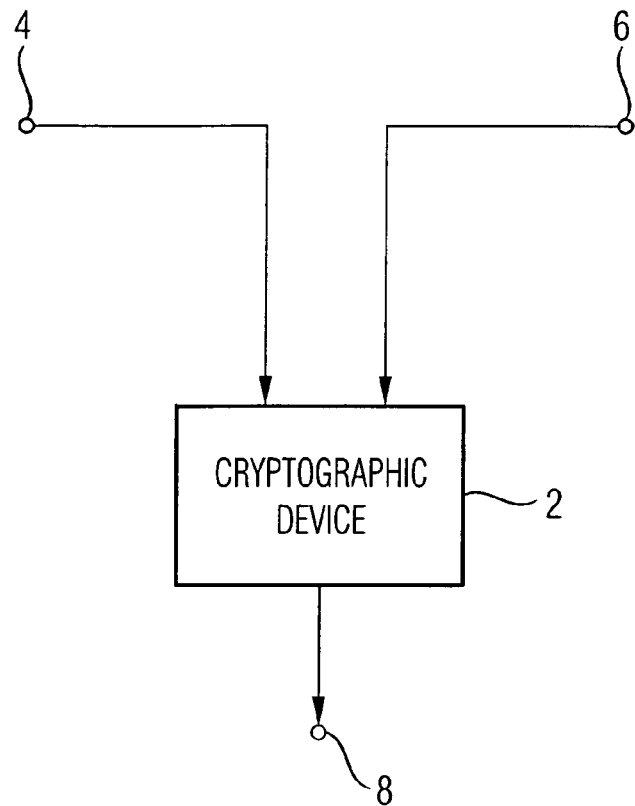
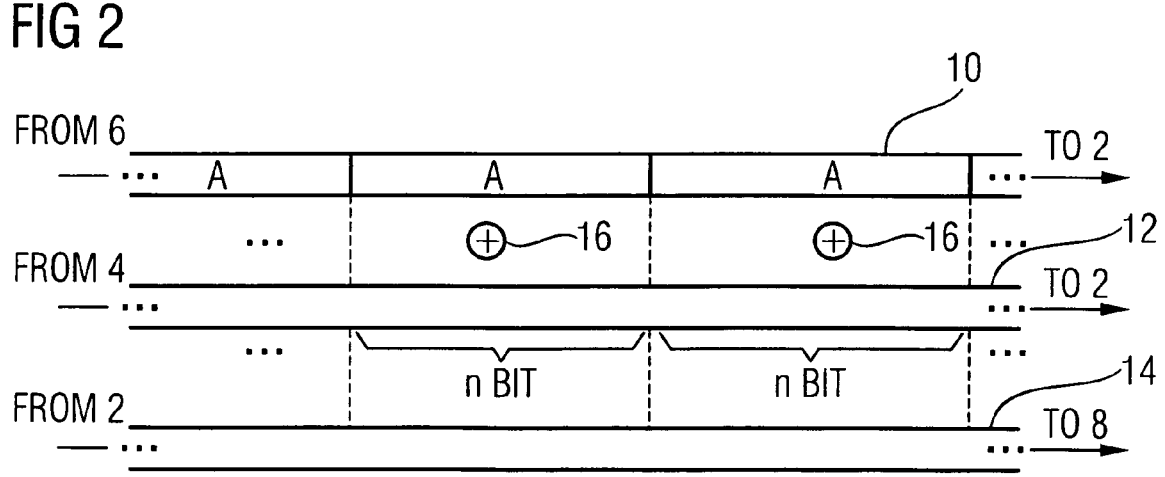

FIG 5A

| CLOCK CYCLE n-1 | REGISTER 200A $s_n$ | REGISTER 200B $s_{n+1}$ | REGISTER 200C $s_{n+2}$ | REGISTER 200D $s_{n+3}$ | REGISTER 200E $s_{n+4}$ | REGISTER OUTPUT SIGNAL s |
|---|---|---|---|---|---|---|
| 1 | 1 | 1 | 1 | 0 | 1 | |
| 2 | 1 | 1 | 0 | 1 | 0 | 1 |
| 3 | 1 | 0 | 1 | 0 | 1 | 1 |
| 4 | 0 | 1 | 0 | 1 | 0 | 1 |
| 5 | 1 | 0 | 1 | 0 | 0 | 0 |
| 6 | 0 | 1 | 0 | 0 | 0 | 1 |
| 7 | 1 | 0 | 0 | 0 | 0 | 0 |
| 8 | 0 | 0 | 0 | 0 | 1 | 1 |
| 9 | 0 | 0 | 0 | 1 | 0 | 0 |
| 10 | 0 | 0 | 1 | 0 | 0 | 0 |
| 11 | 0 | 1 | 0 | 0 | 1 | 0 |
| 12 | 1 | 0 | 0 | 1 | 0 | 0 |
| 13 | 0 | 0 | 1 | 0 | 1 | 1 |
| 14 | 0 | 1 | 0 | 1 | 1 | 0 |
| 15 | 1 | 0 | 1 | 1 | 0 | 0 |
| 16 | 0 | 1 | 1 | 0 | 0 | 1 |
| 17 | 1 | 1 | 0 | 0 | 1 | 0 |
| 18 | 1 | 0 | 0 | 1 | 1 | 1 |
| 19 | 0 | 0 | 1 | 1 | 1 | 1 |
| 20 | 0 | 1 | 1 | 1 | 1 | 0 |
| 21 | 1 | 1 | 1 | 1 | 1 | 0 |
| 22 | 1 | 1 | 1 | 1 | 0 | 1 |
| 23 | 1 | 1 | 1 | 0 | 0 | 1 |
| 24 | 1 | 1 | 0 | 0 | 0 | 1 |
| 25 | 1 | 0 | 0 | 0 | 1 | 1 |
| 26 | 0 | 0 | 0 | 1 | 1 | 1 |
| 27 | 0 | 0 | 1 | 1 | 0 | 0 |
| 28 | 0 | 1 | 1 | 0 | 1 | 0 |
| 29 | 1 | 1 | 0 | 1 | 1 | 0 |
| 30 | 1 | 0 | 1 | 1 | 1 | 1 |
| 31 | 0 | 1 | 1 | 1 | 0 | 1 |
| 32 | 1 | 1 | 1 | 0 | 1 | 0 |

Rows 1–31: PERIOD DURATION

FIG 5B

| | UNDERLYING PRIMITIVE POLYNOMIAL | FEEDBACK | BIT SEQUENCE WITH INITIAL OCCUPATION |
|---|---|---|---|
| FIG 4A | $f_1(x) = x^5 + x^2 + 1$ | $s_{n+5} = s_{n+2} + s_n$ | $\sigma_1 = 0000100101100111100011011101011\mid00001...$ |
| FIG 4B | $f_2(x) = x^5 + x^3 + 1$ | $s_{n+5} = s_{n+3} + s_n$ | $\sigma_1 = 0000101011011000111111001101001\mid00001...$ |
| FIG 4C | $f_3(x) = x^5 + x^3 + x^2 + x + 1$ | $s_{n+5} = s_{n+3} + s_{n+2} + s_{n+1} + s_n$ | $\sigma_1 = 0000101101010001101111100100011\mid00001...$ |
| FIG 4D | $f_4(x) = x^5 + x^4 + x^2 + x + 1$ | $s_{n+5} = s_{n+4} + s_{n+2} + s_{n+1} + s_n$ | $\sigma_1 = 0000111001101111101000100101011\mid00001...$ |
| FIG 4E | $f_5(x) = x^5 + x^4 + x^2 + x + 1$ | $s_{n+5} = s_{n+4} + s_{n+3} + s_{n+1} + s_n$ | $\sigma_1 = 0000110010011111011100010101101\mid00001...$ |
| FIG 4F | $f_6(x) = x^5 + x^4 + x^3 + x^2 + 1$ | $s_{n+5} = s_{n+4} + s_{n+3} + s_{n+2} + s_n$ | $\sigma_1 = 0000110010011110111000101101101\mid00001...$ |

US 7,764,789 B2

KEY BIT STREAM GENERATION

CROSS-REFERENCE TO RELATED APPLICATION

This application claims priority from German Patent Application No. 102004010666.5, which was filed on Mar. 4, 2004, and is incorporated herein by reference in its entirety.

BACKGROUND OF THE INVENTION

1. Field of the Invention

The present invention relates to key bit stream generation, such as the generation of a key bit stream such as is used, for example, for Vigenère encryption and decryption.

2. Description of Prior Art

In a plurality of cryptographic algorithms, a key bit stream is generated from a main key, or a master key, on the basis of which key bit stream the data stream to be encrypted will then be encrypted. These cryptographic algorithms include, for example, the Vigenère algorithm, or algorithms derived from same, wherein a key bit stream with a certain period duration is generated from a master key, and wherein this key bit stream is then linked, in a bitwise manner, with the data stream to be encrypted, to be precise by means of an XOR operation, or XOR linkage. The same procedure is adopted on the decryption side, meaning that the encrypted data stream is XORed, in a bitwise manner, with the same key bit stream which is generated in the same manner on the decryption side on the basis of the same master key.

For generating bit sequences with specific period durations, feedback shift registers, such as linear feedback shift registers (LFSRs) are mostly used even though it is also possible to use non-linear feedback shift registers, or NLFSRs. Even though the output signal of such a feedback shift register might directly be used as the key bit stream, use is mostly made of several feedback shift registers simultaneously, whose output bit sequences are then combined with each other in a bitwise manner so as to obtain the eventual key bit stream. FIG. 6 shows a potential arrangement of a key bit stream generation device 910 of this type. The key bit stream generation device 910 includes, by way of example, four LFSRs 912a, 912b, 912c and 912d. They have different period durations and are loaded, during initialization, i.e. at the beginning of the encryption or decryption, with different parts of a master key, respectively, permanently stored in a memory 914. The LSFRs 912a-d each generate bit sequences with their respective bit lengths and pass them on to a combiner 916 which combines the individual bit sequences of the LFSRs 912a-d in a bitwise manner using a Boolean combination function so as to obtain the eventual key bit stream and output same at an output 918.

Any encryption using the key bit stream generation device 910 of FIG. 6 is not safe from cryptographic attacks. For example, an attack scenario consists in an attacker trying to "crack" the encryption in a so-called known plain text attack. In this attack, an attacker uses a long text, or a long data stream, in a non-encrypted form (plain text) known to him/her so as to obtain the associated cipher from the cryptographic device, which uses the device 910 of FIG. 6, upon applying the plain text. To encrypt these known plain texts, the secret key from memory 914 is then used, of course. By means of this attack, the attacker may now readily calculate the encryption sequence and/or the key bit stream at output 918 of device 910. Subsequently, the attacker analyzes the key bit stream with the goal of finding out, on the one hand, the secret key given by the initial occupation of the flip-flops of the individual shift registers 912a-912d, and of determining, on the other hand, the precise form of the LFSRs 912a-912d in the encryption device which uses the key bit stream generation device 910.

Prior approaches to raise the security level of an encryption device on the device of FIG. 6 have so far consisted only in increasing the number of shift registers used, or the size of the shift registers. However, this entails an unacceptable increase in hardware costs, since cryptographic devices are frequently implemented in mass articles, such as chip cards or smart cards or the like, and such increases in manufacturing costs therefore have a pronounced impact on the profit margin. To save hardware costs, there is therefore a tendency towards a desire to build the encryption device, based on LFSRs or NLFSRs, as small as possible.

SUMMARY OF THE INVENTION

It is an object of the present invention to provide a key bit stream generation scheme and an encryption scheme based thereon, so that the security level is highly increased, in comparison, at moderate additional expenditure.

In accordance with a first aspect, the invention provides a device for generating a key bit stream, having:
 a feedback shift register for generating a bit sequence;
 a decimator for picking out, on the basis of a decimation value m, every $m^{th}$ bit of the bit sequence so as to obtain the key bit stream; and
 a readjuster for readjusting the decimation value m in response to a predetermined event.

In accordance with a second aspect, the invention provides a device for encrypting a data stream, having:
 a device for generating a key bit stream, having:
  a feedback shift register for generating a bit sequence;
  a decimator for picking out, on the basis of a decimation value m, every $m^{th}$ bit of the bit sequence so as to obtain the key bit stream; and
  a readjuster for readjusting the decimation value m in response to a predetermined event; and
 a device for encrypting the data stream on the basis of the key bit stream.

In accordance with a third aspect, the invention provides a device for decrypting an encrypted data stream, having:
 a device for generating a key bit stream, having:
  a feedback shift register for generating a bit sequence;
  a decimator for picking out, on the basis of a decimation value m, every $m^{th}$ bit of the bit sequence so as to obtain the key bit stream; and
  a readjuster for readjusting the decimation value m in response to a predetermined event; and
 a device for decrypting the encrypted data stream on the basis of the key bit stream.

In accordance with a fourth aspect, the invention provides a method of generating a key bit stream, the method including the steps of:
 generating a bit sequence by means of a feedback shift register;
 picking out, on the basis of a decimation value m, every $m^{th}$ bit of the bit sequence so as to obtain the key bit stream; and
 readjusting the decimation value m in response to a predetermined event.

In accordance with a fifth aspect, the invention provides a computer program with a program code for performing the method of generating a key bit stream, the method including the steps of:
 generating a bit sequence by means of a feedback shift register;

picking out, on the basis of a decimation value m, every $m^{th}$ bit of the bit sequence so as to obtain the key bit stream; and readjusting the decimation value m in response to a predetermined event, when the computer program runs on a computer.

The core concept of the present invention is the idea that the security level of a cryptographic encryption scheme based on a key bit stream may be highly improved if the bit sequence generated by a feedback shift register is decimated, in a predetermined manner which is known on the decryption side, with a variable decimation value m (m∈IN), i.e. if every $m^{th}$ bit of the bit sequence is picked out of the bit sequence so as to obtain the key bit stream.

While the additional expenditure in terms of hardware and key generation time duration is low, attack analysis is comparatively highly impeded by the inventive change in the key sequence. All of a sudden, attackers now have to deal with a key sequence which stems, as it seems, from a different encryption device. More specifically, on the attacker side, all of a sudden one is faced with a key bit stream that seems to have been generated by an encryption device which exhibits the same architecture and of the same initial occupation of internal flip-flops, but which has other shift registers and/or other feedback branches. Even though the decimation causes the performance of the encryption device which uses the key bit stream to be reduced either permanently or only temporarily, this is not critical in many cases, however. At any rate, the security level of the key sequence generated is increased considerably in comparison therewith. In other words, what results is an enormous increase in security at the cost of only a temporary or comparatively small reduction in performance.

As a consequence, one advantage of the present invention is the fact that it is possible to increase the security of encryption devices based on linear or non-linear feedback shift registers and/or on key bit streams obtained herefrom.

A further advantage of the present invention is that hardly any hardware is required to increase security. In connection therewith, an advantage of the present invention is also that the inventive principle may be retrofitted even with existing encryption devices.

BRIEF DESCRIPTION OF THE DRAWINGS

Preferred embodiments of the present invention will be explained below in more detail with reference to the accompanying figures, wherein:

FIG. 1 shows a simplified block diagram of an encryption or decryption device using a key bit stream for encryption or decryption, in accordance with an embodiment of the present invention;

FIG. 2 is a schematic representation for illustrating the operation of the device of FIG. 1 in an encryption;

FIG. 5a is a table for illustrating the operation of the linear feedback shift register of FIG. 4a;

FIG. 5b is a table for combining the characteristics of the linear shift registers of FIGS. 4a-4f.

DESCRIPTION OF PREFERRED EMBODIMENTS

Figure 3:
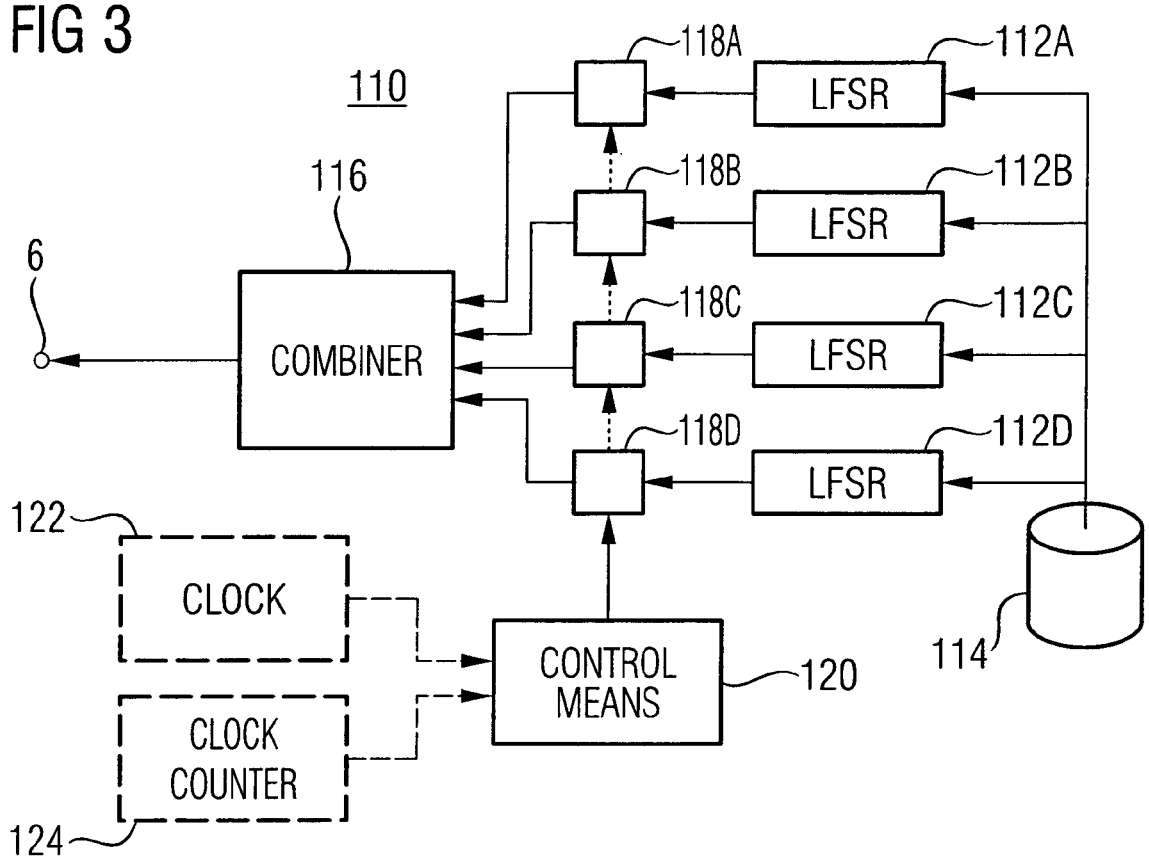
FIG. 3 is a block diagram of a key bit stream generation device in accordance with an embodiment of the present invention.
Figure 6:
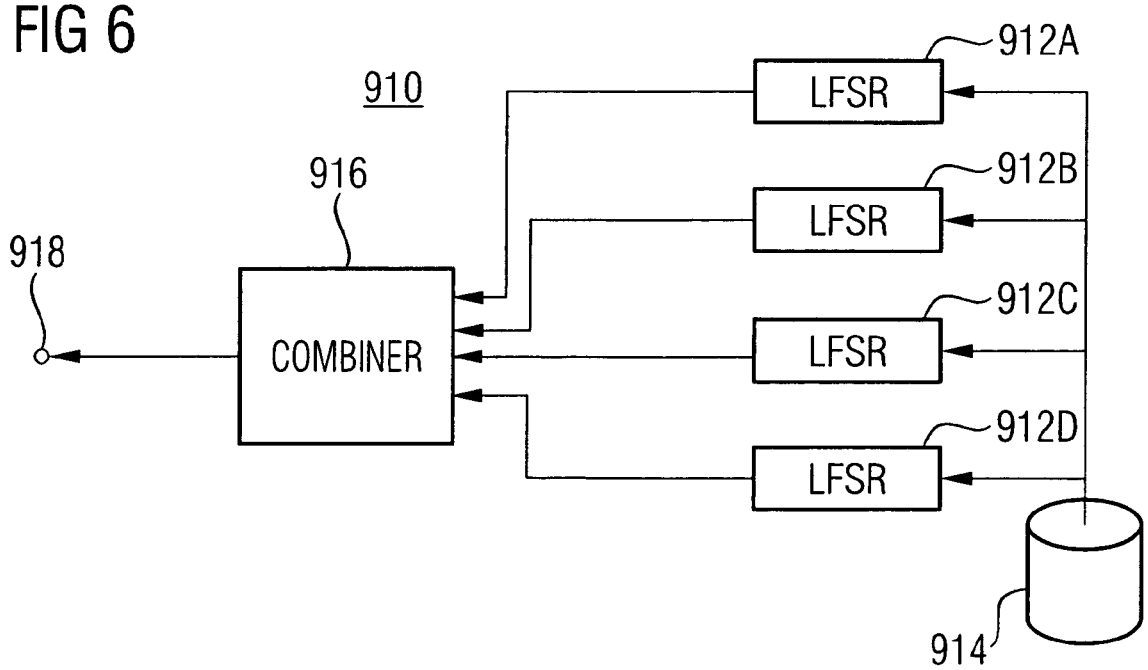
FIG. 6 is a block diagram of a potential conventional key bit stream generation device.

FIG. 1 initially shows an embodiment of an encryption and/or decryption device which uses a key bit stream for encryption and/or decryption. The encryption and/or decryption device—referred to as cryptographic device below—is generally designated by 2. It includes an input 4, wherein, depending on whether device 2 performs an encryption or decryption, a non-encrypted or encrypted data stream is obtained, a key bit stream input 6, wherein the key bit stream is obtained, and an output 8, where the cryptographic device 2 outputs the encrypted or decrypted data stream, depending on whether there is an encryption or a decryption.

Even though, as will be described in more detail at the end of the description of the figures, the cryptographic device 2 may implement any cryptographic algorithm wherein a key bit stream is used to encrypt and/or decrypt a data stream, it shall be assumed below that the cryptographic device 2 is a cipher of the type that implements a Vigenère algorithm. To further illustrate the operation of the cryptographic device 2 for this case, reference shall be made below to FIG. 2 and, at the same time, to FIG. 1.

FIG. 2 schematically shows in a superimposed manner, from top to bottom, the key bit stream 10 passing from input 6 to cryptographic device 2, the data stream 12 to be encrypted or decrypted, which passes from input 4 to the cryptographic device 2, and the encrypted or decrypted data stream 14 output by cryptographic device 2 at output 8. As may be seen, it shall be assumed that the key bit stream 10 obtained at input 6 has a certain periodicity, to be precise a periodicity with a period duration of n. In other words, contents A of key bit stream 10 repeats itself every n bits. The cryptographic device 2 now XORs, in a bitwise manner, key bit stream 10 with data stream 12, the XOR operation being indicated by 16 in FIG. 2, which results in an encryption and/or decryption result being obtained at output 8 in the form of the data stream 14 from the data stream 10 at input 4. On the grounds of the symmetry of the XOR operation, applying the key bit stream 12 to the encryption and/or decryption result 14 by the XOR operation 16 in the same manner, i.e. with the same bit offset between streams 10 and 12 and/or 12 and 14, again leads to the original data stream 10, which is why the cryptographic device 2 may serve both as an encryption device and as a decryption device.

FIG. 3 shows an embodiment of a key bit stream generation device in accordance with an embodiment of the present invention. The key bit stream generation device of FIG. 3, generally indicated as 110, includes four LFSRs 912a, 912b, 912c, 912d, a memory 114 for providing a master key serving as an initial occupation for the LFSRs 912a-d, and a combiner 116, the output of which represents the output of the device 110 and is connected to the key bit stream input 6 of the cryptographic device 2 of FIG. 1.

In addition, device 110 of FIG. 3, however, comprises four decimation means 118a, 118b, 118c, 118d which are each connected between one of the decimation means 112a-d and the combiner 116 and are controlled by a control means 120 of device 110 with regard to decimation values $m_1 \ldots m_4$ to be used by means of a vector $(m_1, m_2, m_3, m_4)$ as well as optionally a clock 122 for providing the control means 120 with an absolute time indication, or a clock counter 124 for providing the control means 120 with a clock counter value which, as will be described below, may serve as a measure of a time period that has expired from a predetermined event onwards.

Since the structure of the key bit stream generation device 110 of FIG. 3 has been described above, what follows now is a description of its operation. Each of the LFSRs 112a-d generates a bit sequence once they have been initialized as an initial occupation of their internal registers by means of a part, respectively, of the master key from memory 114, the bit sequence having a certain periodicity, which may be different from that of the others of the LFSRs, and/or a certain period duration. For example, LFSR 112a has a period duration of $n_1$, LFSR 112b has a period duration of $n_2$, LFSR 112c has a period duration of $n_3$, and LFSR 112d has a period duration of $n_4$. For reasons which will be explained below in more detail, period durations $n_1 \ldots n_4$ preferably are relatively prime with respect to one another.

The bit sequences output by LFSRs 112a-d are decimated, by decimation means 118a-118d, which are connected between the output of an LFSR 112a and an input of the combiner 116, respectively, by a decimation value adjusted for each decimation means 118a-d by control means 120. Here, decimating means picking out every $m^{th}$ bit from the respective bit sequence of the bit sequences of the LFSRs 112a-d, m representing the respective decimation value. In other words, each of the decimation means 118a-d only allows every $m^{th}$ bit of the bit sequence of the respective LFSRs 112a-d to pass to combiner 116, each decimation means 118a-118d using its own decimation value $m_i$ (with $i=1 \ldots 4$) adjusted by control means 120, as will be described below. The period durations of the decimated bit sequences, as are obtained by the combiner 116 at its four inputs, may correspond, as will be described in the following embodiments, to the period durations of the bit sequences as are output by the LFSRs 112a-d. However, they may also be different from same.

In other words, the pairs of decimation means and LFSRs interact such that the control by control means 120 leads to the fact that not every sequence member is output, but that, for example, every other sequence member or one in three or one in five sequence members are output, as will be described below. The output sequences, which are thus decimated and/or thinned out, of the individual shift registers are then processed further by combiner 116.

In a bitwise manner, combiner 116 combines the decimated bit sequences by a Boolean combination function F which is preferably non-linear to as large an extent as possible. More specifically, combiner 116 always waits until it has obtained a next bit from every decimation means 118a-d, and then combines, in a bitwise manner, these four bits in a deterministic manner and/or with the function F to obtain a bit of the eventual key bit sequence, and to output same to output 6. Subsequently, combiner 116 processes the next bit of the four decimation means 118a-d. Since the decimation means 118a-d pass on, depending on the decimation value m, only every $m^{th}$ value of the bit sequence of the respective LFSRs 112a-d, the combiner always has to wait for the next complete set of four bits, to be linked, from decimation means 118a-d, for as long as is specified by the largest decimation value of means 118a-d, if the output clock rate is the same for all LFSRs 112a-d. This gives rise to the decrease in performance, which will be explained below in more detail and has already been alluded to above, due to the provision of decimation means 118a-d, however, the decrease in performance being more than compensated for by the increase in security, as has already been mentioned and will be explained below in more detail.

The result of the bitwise linking of the decimated bit sequences, output by the combiner 116 at its output, is the key bit stream obtained by the cryptographic device 2 of FIG. 1 at the key bit stream input 6, and used for encryption and/or decryption. As long as the period durations $n_1' \ldots n_4'$ of the decimated bit sequences have no common divisor/are relatively prime with respect to one another, the period duration n of the key bit stream corresponds to the product of the four period durations of the decimated bit sequences ($n=n_1' \cdot n_2' \cdot n_3' \cdot n_4'$), whereby an enormously long period duration n is achieved despite a small sum of the number of internal registers of the LFSRs 112a-d and/or despite a short overall register length.

Control means 120 is operatively connected to decimation means 118a-d so as to be able to specify, or adjust, the decimation value which is to be used by same, by a quadruple and/or a vector of four decimation values. The times when control means 120 readjusts the decimation values for decimation means 118a-118d by a new decimation vector are determined by control means 120 in a manner which is specified in advance, so that it is known, on the decryption side, for an addressed or authorized decryptor, so that during a decryption operation, the readjustments are performed at precisely the same points in time, and/or at the same bits of the key bit stream as is the case in encryption and/or at corresponding times, i.e. after a corresponding number of bits of the data stream at inputs 4 and/or 6 (FIG. 1). After a readjustment, decimation means 118a-d operate with the readjusted decimation values.

For example, control means 120 may change the decimation on a weekly basis. Depending on the calendar week, which may be determined by control means 120 via clock 122, control means 120 adjusts the decimation values to one of 52 pre-stored decimation quadruples which are known on the decryption side. However, instead of a week-by-week readjustment, it is also possible to perform a readjustment which is dependent on the day of the week, or the like. Since, in accordance with this embodiment, the readjustment times are determined in dependence on an absolute time measure, care may be taken to ensure that two communication partners, who communicate with each other in an encrypted manner via two independent encryption devices 2 and 110, always use identical decimation ratios and, as a consequence, identical key bit sequences.

However, control means 120 might also change the decimation values at predetermined points in time during an encryption or decryption by supervising a clock counter 124 to see whether the counter reading exceeds a predetermined threshold value. For example, clock counter 124 starts to count, e.g., at predetermined events starting from a predetermined initialization value, such as zero, such as from the beginning of the encryption and/or decryption for which the key bit stream is required at output 6 of device 110. Here, the count rate might correspond to the bit rate of the data stream at input 4, or depend thereon. Hereby, control means 120 would effectively perform the readjustment after a predetermined time duration after the beginning of the encryption and/or the decryption. It is also possible that the clock counter 124 is reused thereafter so that control means 120 repeats the readjustments in a cyclical manner at predetermined time intervals. In this manner, encryption and decryption may be performed in such a manner that they are offset from one another in time, e.g. after being stored, in the meantime, in a memory, such as an EEPROM of a chip card, without the temporal distance between the absolute time of the encryption and the absolute time of the decryption leading to inadvertent error in decryption.

As soon as a readjustment of the decimation values is to occur, control means 120 may perform it in various manners. One possibility is the above-mentioned access to a table by means of, e.g., the absolute time indication as is provided by clock 122, or by means of a quantization value determined therefrom, e.g. the number of the calendar week, the day of the week or the like. However, access may also occur by means of the old decimation values as an index. A further possibility is to map the decimation values to new decimation values by arithmetic calculation. A further possibility is to cyclically read out a list of decimation value quadruples ($m_1$, $m_2$, $m_3$, $m_4$) from a list of predetermined decimation value quadruples.

Prior to the beginning of an encryption or decryption, memory 114 loads the registers 112a-112d on the basis of the master key stored in memory 114. In this manner, the bit sequences output by LFSRs 112a-112d start with the initial occupation of the internal registers, both on the decryption and encryption sides.

In the above description of FIG. 3, the inner structure of LFSRs 112a-d was not explained in detail. Also, the decimation values and their relations to the period durations of LFSRs 112a-d were not explained in detail by exemplary examples. More detailed embodiments for pairs of decimation means and associated LFSRs 18a, 112a to 118d, 112d will be explained further below.

For example, the LFSRs are preferably such types which consist of N internal registers and/or flip-flops which are connected in series and are provided with a common feedback and which have the characteristic of generating bit sequences of a period duration of $2^N-1$. In total, there are $2^N$ LFSRs with N cells. Of these, $\phi(2^N-1)/N$ have the characteristic of being able to generate sequences of the period duration of $2^N-1$. Here, $\phi()$ designates Euler's function. If A is a natural number, $\phi(A)$ signifies the number of figures from the quantity $\{1, 2, 3, 4, \ldots A-1, A\}$ which are relatively prime with respect to A. If, for example, $A=10$, $\phi(A)=4$ applies, since among figures 1 to 10 there are exactly four numbers which are relatively prime with respect to $A=10$, i.e. the figures 1, 3, 7 and 9.

Let us consider, for example, the LFSRs of a length of 5, i.e. with 5 internal registers, and/or let us consider the case of $N=5$. The number of LFSRs of a length of 5 is $2^5$, i.e. 32. $2^N-1=2^5-1$ (with $N=5$) is 31. Since 31 is a prime number, all figures from 1 to 30 are relatively prime with respect to 31. Consequently, $\phi(2^5-1)=\phi(31)=30$ (for $N=5$). As a consequence, in turn, for $\phi(2^N-1)/N$ with $N=5$, $\phi(31)/5=30/5=6$ applies so that, in accordance with the above formula, among the 32 LFSRs of a length of 5 there are precisely 6 LFSRs which have the characteristic of being able to generate bit sequences of the period duration $2^5-1=31$, which is maximum for LFSRs of a length of 5.

If one looks at these six LFSRs of a length of 5 in more detail, one will find that what they have in common is that all of them generate a sequence of a period duration of 31 if one loads their five internal registers and/or flip-flops in any manner desired at the initialization, with the sole exception that not all five internal registers and/or flip-flops are allowed to contain the value of zero. The 6 LFSRs of a length of 5 which have the above-mentioned characteristic are obtained and/or defined by the 6 primitive polynomials over GF(2) (GF=Golomb field) of a degree of 5:

$f_1(x)=x^5+x^2+1$ $f_2(x)=x^5+x^3+1$ $f_3(x)=x^5+x^3+x^2+x+1$ $f_4(x)=x^5+x^4+x^2+x+1$ $f_5(x)=x^5+x^4+x^3+x+1$ $f_6(x)=x^5+x^4+x^3+x^2+1$

Figure 4A:
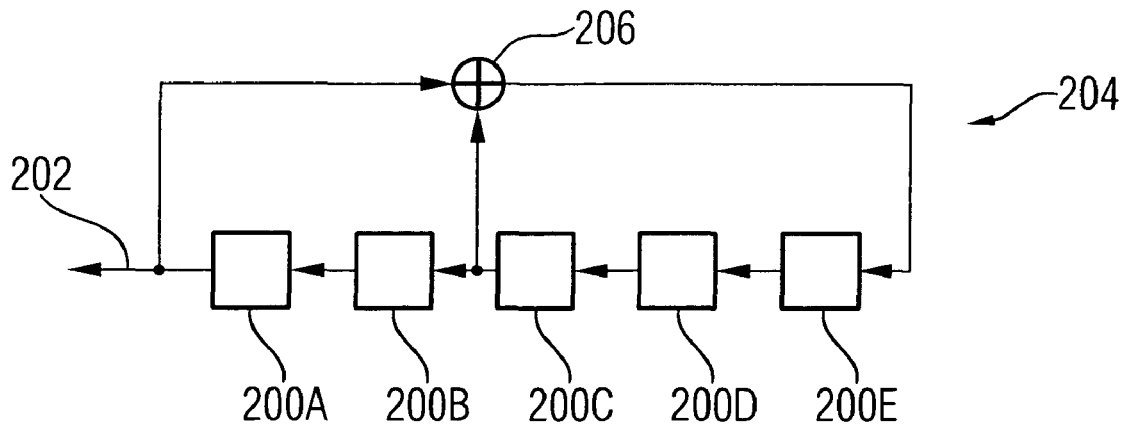
FIGS. 4a-f are block diagrams of linear feedback shift registers with five flip-flops.
Figure 4B:
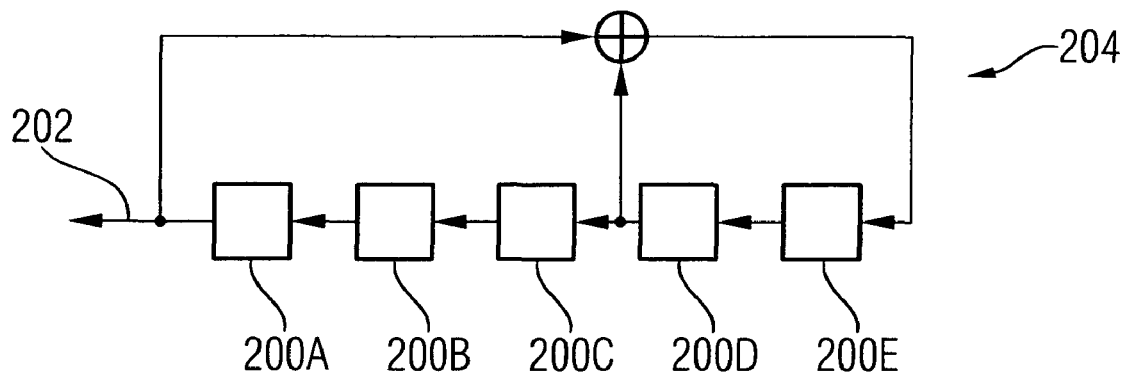
Figure 4C:
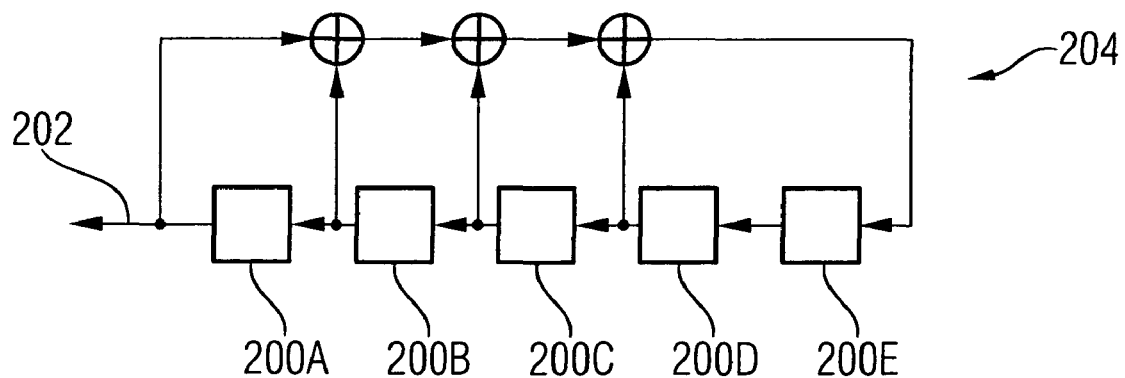
Figure 4D:
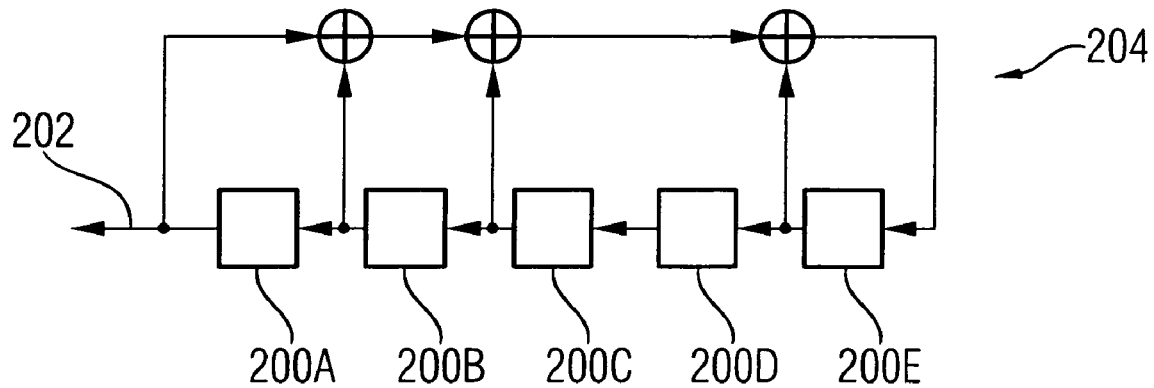
Figure 4E:
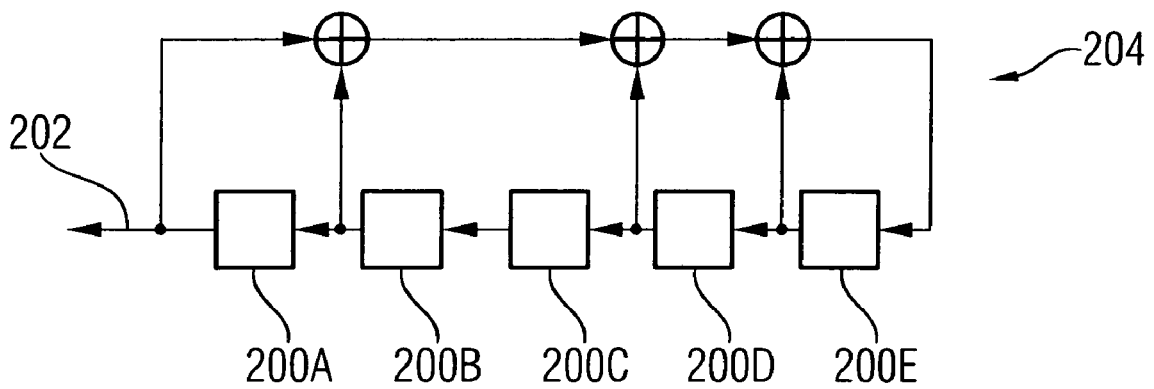
Figure 4F:
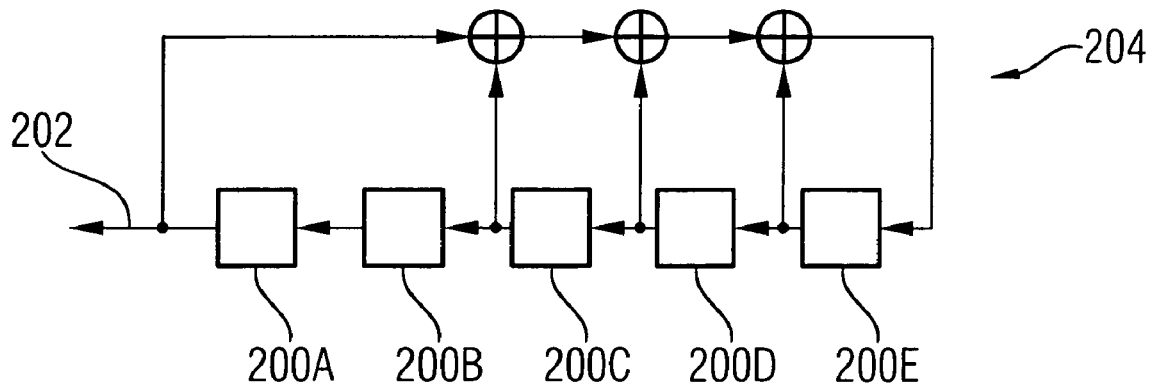

Exemplary LFSRs which correspond to those defined by polynomials $f_1(x) \ldots f_6(x)$ are represented in FIGS. 4a-4f, specifically, in FIG. 4a, that LFSR which corresponds to polynomial $f_1$, in FIG. 4b, that LFSR which corresponds to polynomial $f_2$, ... and in FIG. 4f, that LFSR which corresponds to polynomial $f_6$. Each of the LFSRs of a length of N, with presently $N=5$, includes N internal one-bit registers and/or D-flip-flops 200a, 200b, 200c, 200d and 200e, which are connected in series, as may be seen in FIGS. 4a-4f, so as to shift their respective bit contents to the respective subsequent internal register per clock cycle. That internal register 200a which is last in the row outputs, per clock cycle, its bit register contents at an output 202 of the LFSR as well as into a feedback branch 204 which is different for each of the LFSRs of FIGS. 4a-4f, and in which XOR gates are connected so as to sum up modulo 2, or link, the register content of register 200a, as is shown in FIGS. 4a-4f, with the register content of at least one of the other registers 200b-200e, by means of XOR operations and to feed same back to that internal register 200e which is arranged furthest away from output 202.

For a better understanding of the structure of the LFSRs of FIGS. 4a-4f, it should be noted that, since the internal registers 200a-200e are, after all, connected in series immediately one behind the other, the output-side register 200e always contains and/or outputs the current bit $s_n$ of the bit sequence generated by the respective LFSR, whereas the other internal registers 200b-200e contain the respectively subsequent and/or future bits of the bit sequence at output 202, i.e. register 200b, bit $s_{n+1}$ immediately following the current bit $s_n$, register 200c, the next bit $s_{n+2}$, register 200d, the next bit $s_{n+3}$, and register 200e, the next bit $s_{n+4}$, the index indicating the bit position of the respective bit in the bit sequence s, as is output by the respective LFSRs of FIGS. 4a-f at output 202. If this designation is used for the register contents of registers 200a-200e at a specific point in time, i.e. at a point in time when the bit at bit position n is the current bit of the bit sequence of the LFSR, an XOR gate 206 is connected, for example, in the feedback path 204 of the LFSR of FIG. 4a such that the XOR gate always XORs the feedback bit $s_n$ with the register content of register 200c, i.e. $s_{n+2}$, and/or performs a modulo 2 addition with same so as to feed back the result into register 200e. In the case of the LFSR of FIG. 4a, the feedback path 204 therefore is of such a nature that $s_{n+5}=x_{n+2}+s_n$, wherein $s_{n+5}$, after all, is the memory content of register 200e in the following clock cycle.

The latter equation does not only describe the LFSR of FIG. 4a and/or its feedback path 204, but, in addition, a characteristic of the bit sequence s generated by same, since this equation must always be met for a bit of a bit position n, a bit of a position n+2 and a bit of a bit position n+5. As has already been mentioned above, the LFSR of FIG. 4a results in a bit sequence of a period duration of 31. In other words, the bit sequence of the LFSR of FIG. 4a which is output repeats itself every 31 bits.

In order to further illustrate the operation of the LFSR of FIG. 4a, and in order to illustrate, in particular, that the LFSR of FIG. 4a leads to a bit sequence of a period duration of 31, FIG. 5a shows, in a table, in 32 subsequent clock cycles indicated in the left-hand column, the resulting register contents of registers 200a-200e (central columns) as well as, in the right-most column, the register output signal at output 202 at a respective clock cycle. As may be seen, one assumed in FIG. 5a that in clock cycle (=n−1) 1, the LFSR of FIG. 4a was loaded with an initial occupation of 11101. Towards the next clock cycle 2, each register 200b-200e outputs its respective register bit content to the subsequent register 200a-200d, the output-side register 200a firstly outputting its register content $s_n$, as a bit of the bit sequence s at output 202, so that the bit of the bit signal s in clock cycle 2, i.e. $s_2$, corresponds to the register content of register 200a at a clock cycle of (n−1)=1, i.e. "1", and secondly outputting its register content $s_n$, added in a modular manner, with the register content of register 200c at the clock cycle of 1, i.e. with "1", via the feedback path 204 to register 200e, which is why the register content of this register 200e results in "0" (=1 XOR 1) at the clock cycle of 2.

As may be seen, the original register configuration of clock cycle 1 is reestablished in registers 200a-200e after 32 clock cycles, so that what results is a period duration of 31 clock cycles for the output signal generated by the LFSR of FIG. 4a and/or the bit sequence generated by the LFSR of FIG. 4a, as has already been determined above. Upon the initialization of the LFSR of FIG. 4a with an initial occupation of 11101, what results, specifically, is a bit sequence s of 11101010000100101100111100011011101 . . . .

With a different initial occupation, what results is also a bit sequence of a period duration of 31, which, however, starts in a manner which is offset to that just mentioned. With an initial occupation of 00001, what results is, for example, a bit sequence s which starts as follows: 00001001011001111100011011110101|0000100 . . . .

The above description is related to the LFSR of FIG. 4a by way of example only, but may readily be transferred to the other LFSRs shown in FIGS. 4b-4f. In the table of FIG. 5, what is shown for the individual FIGS. 4a-4f are the characteristics of the respective LFSR depicted in the respective figure. What is represented, in particular, in the second column is the respective polynomial which corresponds to the LFSR of the respective figure, the third column depicts the sum of the register contents which is fed back as a sum $s_{n+5}$ to the last register 200e, and the fourth column depicts the resulting bit sequence s from the beginning for that case where the initial occupation is 00001.

As is shown in the table of FIG. 5b, each of the LFSRs of FIGS. 4a-4f generates a bit sequence of a period duration of 31. What applies to each of the LFSRs of FIGS. 4a-4f, as has been shown by way of example in FIG. 5a for the LFSR of FIG. 4a, is that the occupation of registers 200a-200e adopts each of the potential quintuples of bits, which consists not only of five zeros, precisely once during a period and/or in 31 successive clock cycles. the order in which the quintuples occur varies, however.

It may now be shown that each of the six LFSRs of FIGS. 4a-4f may be simulated with the help of one of the other LFSRs if the bit sequence of these other LFSRs is decimated, i.e. if only every $m^{th}$ bit is picked out from the bit sequence so as to obtain the eventual bit sequence.

More specifically, one of the LFSRs of FIGS. 4a-4f generates, for example, the bit sequence $s_0, s_1, s_2, s_3, s_4, s_5, s_6, s_7, s_8, \ldots$. If one takes the figure m, which is relatively prime with respect to the period duration, i.e. 31 in the present example, and if one picks out every sequence member from the above sequence, starting with so, so that the resulting sequence reads $s_0, s_m, s_{2m}, s_{3m}, s_{4m}, \ldots$, this decimated sequence is identical with the output sequence of one of the five other LFSRs of FIGS. 4a-4f. What may also be shown is that in this manner, from one specific LFSR of a specific length of N, which exhibits the characteristic of generating a bit sequence of a period duration of $2^N-1$, all other LFSRs of the same length and with the same characteristics may be simulated.

More specifically, if one makes the decimation factor m pass through all numbers from 1 to $2^N-1$ which are relatively prime with respect to the period duration of $2^N-1$, and if one decimates, with m, the output sequence of a specific LFSR of a length of N, one obtains, precisely N times, every output sequence of each of the LFSRs of a length of N, which generate bit sequences of the period duration of $2^N-1$.

Let us consider, for example, the bit sequence of the above table for initial occupations 0001 of the LFSR of FIG. 4a. If this bit sequence is decimated with m=3, or if every third bit is picked out from this bit sequence, one obtains the bit sequence 000101011010000110010011111101111|00010 . . . . However, this is a shifted version of a bit sequence as generated by the LFSR in according with FIG. 4f. Consequently, the shift register according to FIG. 4f is simulated by decimating the bit sequence output by the LFSR according to FIG. 4a.

What applies, in particular, to the LFSRs of a length of 5 which have been explained above is that a decimation of the bit sequence, as is generated by the LFSR according to FIG. 4a, leads to the bit sequences of the following other LFSRs, depending on the decimation value m:

| Decimation value of | Yields, disregarding any offset | Bit sequence of LFSRs of |
|---|---|---|
| m ∈ {1, 2, 4, 8, 16} | → | FIG. 4a |
| m ∈ {3, 6, 12, 24, 17} | → | FIG. 4b |
| m ∈ {5, 10, 20, 9, 18} | → | FIG. 4c |
| m ∈ {7, 14, 28, 25, 19} | → | FIG. 4d |
| m ∈ {11, 22, 13, 26, 21} | → | FIG. 4e |
| m ∈ {15, 30, 29, 27, 23} | → | FIG. 4f |

Since the characteristics of LFSRs have been described above by way of example with reference to LFSRs of a length of 5, the operation of this device will be described again in more detail below with reference to FIG. 3 and with reference to a specific embodiment, wherein the LFSRs are LFSRs of different lengths $N_1 \ldots N_4$, which, however, all have the characteristic of generating bit sequences of the period duration which is maximally possible with this specific register length, i.e. $2^{N_i}-1$ with i=1 . . . 4.

It shall be assumed, in particular, by way of example, that the LFSRs 112a-112d have the following lengths ($2^{nd}$ column) and generate bit sequences of the following period durations ($3^{rd}$ column):

|  | Lengths | Period durations |
|---|---|---|
| LFSR 112a | 7 = $N_1$ | 127 = $n_1$ |
| LFSR 112b | 9 = $N_2$ | 511 = $n_2$ |
| LFSR 112c | 10 = $N_3$ | 1023 = $n_3$ |
| LFSR 112d | 11 = $N_4$ | 2047 = $n_4$ |

The master key stored in memory 114 would have, in the present exemplary case, e.g. the length of 7+9+10+11=27, the first seven bits being loaded into LFSR 112a, the next, subsequent nine bits being loaded into LFSR 112b, the next ten bits being loaded into LFSR 112c, and the last eleven bits being loaded into LFSR 112d at the initialization.

If control means 120 controls the decimation means 118a-118d with the configuration of the LFSRs 112a-112d which is depicted in Table 2 with a decimation value quadruple (m1, m2, m3, m4) which indicates a decimation value $m_i$ (i=1 . . . 4), which is non-zero, for each decimation means 118a-118d, the key bit stream generation device 110 generates a key bit stream of a period duration which corresponds to the product of the period durations $n_i'$ (i=1 ... 4) of the decimated sequences of the individual LFSRs 112a-112d.

However, if at a certain point in time, as has been described above, control means 120 controls means 118a-118d with a readjusted decimation value quadruple, the key bit stream generated by device 110 will change without the LFSRs 112a-112d actually having been changed.

If, in addition, only such decimation values $m_i$ are used which are relatively prime with respect to the respective period duration $n_i$ of the associated LFSR, i.e. if $m_i$ is always relatively prime with respect to $n_i$, the period durations of the decimated bit sequences will remain identical with the period durations of the bit sequences of the individual LFSRs, as has been described above, so that the period duration of the altered key bit stream of device 110, too, remains the same prior to and after the switching of the decimation value quadruple.

If, for example, the decimation value vector were decimated from (1, 1, 1, 1) to (3, 3, 5, 5), and if the output sequence of LFSR 112a were decimated with m=3, the output of LFSR 112b were decimated with m=3, the output sequence of LFSR 112c were decimated with m=5, and the output of LFSR 112d were decimated with m=5, the encryption device 110 of FIG. 3 would behave exactly as if one had bored it open and removed the four LFSRs 112a-d present therein, and replaced same by other LFSRs which have the same characteristic, i.e. the ability to generate bit sequences of the period durations of 127, 511, 1023 and 2047, respectively.

With the decimation value quadruple of (3, 3, 5, 5) which has just been discussed by way of example, the performance of the encryption device 110 is reduced to 20% in comparison with the decimation value quadruple of (1, 1, 1, 1), i.e. with the state without decimation means 118a-118d, and/or with picking out every bit of the bit sequences of LFSRs 112a-112d, since the combiner 116 must wait, for each linkage, for a period of five clock cycles instead of only one clock cycle for all of those bits from the decimated bit sequences which are required for each linkage to arrive at the combiner 116, for bitwise combination of the bits from the decimated bit sequences, as are output by decimation means 118a-118d depending on the highest decimation value—here m=5. More specifically, with the decimation value quadruple of (3, 3, 5, 5), considered by way of example, the decimation means 118c and 118d pick out only one in five bits from the bit sequences of the LFSRs 112c and 112d, and pass them on to the combiner 116. The others are not passed on, but discarded. In accordance, the amount of time expiring up to the passing on of the next bit is always five times as much with these decimation means 118c and 118d in comparison with the case where there is no decimation and/or compared with a decimation value of 1. However, the performance losses are acceptable, since the security level of encryption device 2, which uses the key bit sequence of device 110, rises considerably as a consequence, even if the decimation values for the decimation means 118a-118d is readjusted from time to time only.

Other potential decimation value quadruples are, for example, (3, 3, 5, 7), (5, 3, 5, 5), (11, 3, 7, 5), .... With these, the resulting period duration of the key bit sequence at output 6 always remains the same.

With cycles in accordance with the above description, the following shall be pointed out as well. In the above, the present invention was described by means of a combination of a cryptographic device 2 and a key generator 110, wherein the cryptographic device was a cryptographic device working in accordance with the Vigenère algorithm. However, the present invention is not limited to encryption and/or decryption devices of this type. Other encryption and/or decryption devices could be obtained in that a key bit stream generation device according to FIG. 3 is combined in combination with cryptographic devices of other types, such as a DES or AES module or with any device which operates in accordance with a different symmetric cryptographic algorithm and at the key input of which the key bit stream as is generated by key generator 110 is applied.

In addition, it shall be pointed out that in FIG. 3 the case that the key generator comprises four LFSRs was assumed by way of example only. However, there may be any number of feedback shift registers. It is also possible, in particular, to dispense with the combiner 116 and to implement a key generator only by means of a combination of a decimation means with a feedback shift register.

It shall also be pointed out that it is not necessary to use LFSRs which have the characteristic of generating bit sequences of the period durations which are maximally possible for their register lengths. Rather, other LFSRs may also be used. In addition, use may also be made of decimation values which are not relatively prime with respect to the period duration of the associated LFSR. In this case, only the effective period duration of the decimated bit stream would decrease, which may be acceptable, however, with sufficiently large LFSRs.

Further it shall be pointed out, with reference to the above description, that in order to establish a synchronicity between encryption and/or decryption, the times at which the switching and/or readjustment of the decimation value(s) is effected could be determined by control means 120 in a manner which is different from the manners described above. For example, in a communication between two communication partners by means of encryption and/or decryption based on a key bit stream as is generated by the device in accordance with FIG. 3, one communication partner could inform the other about the times in accordance with a specified protocol.

Also, it is to be noted that the present invention is not limited to linear feedback shift registers. In addition, the present invention may be configured with feedback shift registers which are non-linear.

In addition, it shall be pointed out that the readjustment may be effected by control means 120 in any manner desired, i.e. by providing, as has already been described above, a list of decimation values and/or decimation value vectors, which are passed through in a cyclical manner one after the other from readjustment to readjustment, or by mapping the decimation values to the new decimation values, such as applying a matrix multiplication of the current decimation value vector to the new decimation value vector to be readjusted, or the like.

It shall be pointed out, in particular, that depending on the circumstances, the inventive scheme for key bit stream generation may also be implemented in software. The implementation may be effected on a digital storage medium, in particular a disc or a CD with electronically readable control signals which may interact with a programmable computer system such that the respective method is performed. Generally, the invention thus also consists in a computer program product with a program code, stored on a machine-readable carrier, for performing the inventive method, when the computer program product runs on a computer. In other words, the invention may thus be implemented as a computer program with a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for encrypting a data stream, comprising:
  a key bit stream generator configured to generate a key bit stream, comprising:
    a feedback shift register configured to generate a bit sequence;
    a decimator configured to pick out, on the basis of a decimation value m, every $m^{th}$ bit of the bit sequence so as to obtain the key bit stream consisting of the bits picked out; and
    a readjuster configured to readjust the decimation value m in response to a predetermined event; and
  an encrypter configured to encrypt the data stream on the basis of the key bit stream,
  wherein the feedback shift register is a linear feedback shift register which consists of N internal bit registers and has a characteristic of generating a bit sequence of a period duration of $2^N-1$, and the decimation value m is relatively prime with respect to the period duration so that during times the decimation value m remains constant between consecutive readjustments, the key bit stream is identical with a portion of an output bit sequence of a different linear feedback shift register being different from the feedback shift register of the device, also consisting of N internal bit registers, and also providing a period duration of 2N−1, but having a different characteristic.

2. The device as claimed in claim 1, wherein the bit sequence has a period duration of n, and the decimation value m is relatively prime with respect to the period duration of n.

3. The device as claimed in claim 1, further comprising:
  a provider configured to provide an absolute time indication, the readjuster being configured to perform the readjustment in response to the absolute time indication meeting a predetermined condition.

4. The device as claimed in claim 1, wherein the readjuster is configured to perform the readjustment after a predetermined time period has expired since the time of a predetermined event.

5. The device as claimed in claim 4, wherein the predetermined event is the last time when the readjuster performed a readjustment, a last coupling of the device to an external voltage supply, or a predetermined point in time during, or the beginning of an encryption and/or decryption being in progress and in which the key bit stream is used.

6. The device as claimed in claim 4, wherein the readjuster is configured to perform the readjustment after the predetermined time period has expired since the time of the predetermined event at least once in such manner that m is increased.

7. The device as claimed in claim 1, further comprising an initializer configured to initialize the device by loading a crypto key into the feedback shift register.

8. The device as claimed in claim 1, wherein the encrypter is configured to combine, in a bitwise manner, the data stream with the key bit stream so as to obtain an encrypted data stream.

9. The device of claim 1, wherein the readjuster is configured to readjust the decimation value m several times with the feedback shift register running freely, without being re-seeded, and the encrypter keeping on the encryption therebetween.

10. The device as claimed in claim 1, further comprising:
  a provider configured to provide a specific time indication, the readjuster being configured to perform the readjustment in response to the specific time indication meeting a predetermined condition.

11. The device as claimed in claim 1, wherein the readjuster is configured to perform the readjustment after a predetermined time period has expired since the time of a predetermined event.

12. The device as claimed in claim 1, wherein the readjuster is further configured to perform readjustments several times at points in time deterministically determined, and in such manner that m cycles through a list of decimation values, or in such manner that, at each readjustment, m is readjusted to a new value corresponding to m applied to a predetermined arithmetic calculation function.

13. The device as claimed in claim 1, wherein the readjuster is further configured to perform readjustments several times at points in time deterministically determined, in such a manner that m keeps constant between the readjustments and changes its value at the readjustments and is prime continuously.

14. The device as claimed in claim 1, wherein the readjuster is further configured to perform the readjustment independent from bit values of the bits of the bit sequence generated by the feedback shift register.

15. The device as claimed in claim 1, wherein the decimator is further configured to perform the picking-out of every mth bit of the bit sequence by concurrently discarding remaining bits between the every mth bit of the bit sequence so that the key bit stream obtained thereby merely consists of the bits picked-out.

16. A device for decrypting an encrypted data stream, comprising:
  a key bit stream generator configured to generate a key bit stream, comprising:
    a feedback shift register configured to generate a bit sequence;
    a decimator configured to pick out, on the basis of a decimation value m, every $m^{th}$ bit of the bit sequence so as to obtain the key bit stream consisting of the bits picked out; and
    a readjuster configured to readjust the decimation value m in response to a predetermined event; and
  a decrypter configured to decrypt the encrypted data stream on the basis of the key bit stream,
  wherein the feedback shift register is a linear feedback shift register which consists of N internal bit registers and has a characteristic of generating a bit sequence of a period duration of $2^N-1$, and the decimation value m is relatively prime with respect to the period duration so that during times the decimation value m remains constant between consecutive readjustments, the key bit stream is identical with a portion of an output bit sequence of a different linear feedback shift register being different from the feedback shift register of the device, also consisting of N internal bit registers, and also providing a period duration of 2N−1, but having a different characteristic.

17. The device as claimed in claim 16, wherein the decrypter is configured to combine, in a bitwise manner, the encrypted data stream with the key bit stream so as to obtain a decrypted data stream.

18. The device as claimed in claim 16, further comprising:
a provider configured to provide a specific time indication, the readjuster being configured to perform the readjustment in response to the specific time indication meeting a predetermined condition.

19. The device as claimed in claim 16, wherein the readjuster is configured to perform the readjustment after a predetermined time period has expired since the time of a predetermined event.

20. The device of claim 10, wherein the readjuster is configured to readjust the decimation value m several times with the feedback shift register running freely, without being reseeded, and the decrypter keeping on the decryption therebetween.

21. A device for encrypting a data stream, comprising: a key bit stream generator configured to generate a key bit stream, comprising:
a first feedback shift register configured to generate a bit sequence;
a first decimator configured to pick out, on the basis of a decimation value m, every $m^{th}$ bit of the bit sequence so as to obtain a first bit stream consisting of the bits of the first bit sequence picked out;
a second feedback shift register configured to generate a second bit sequence;
a second decimator configured to pick out, on the basis of a decimation value l, every $l^{th}$ bit of the second bit sequence consisting of the bits of the second bit sequence picked out;
a readjuster configured to readjust the decimation values and l in response to a predetermined event such that m and l are different; and
a combiner configured to combine, in a bit-wise manner, the first and second bit streams so as to obtain a key bit stream; and
an encrypter configured to encrypt the data stream on the basis of the key bit stream.

22. The device as claimed in claim 21, wherein the combiner is configured to non-linearly combine, in a bitwise manner, the bits picked out by the first decimator and the second decimator.

23. The device as claimed in claim 21, wherein the readjuster is configured to perform the readjustment by accessing a list of predetermined decimation values or by performing a predetermined arithmetic calculation on the basis of the decimation values.

24. A device for decrypting an encrypted data stream, comprising:
a key bit stream generator configured to generate a key bit stream, comprising:
a first feedback shift register configured to generate a first bit sequence;
a second feedback shift register configured to generate a second bit sequence;
a first decimator configured to pick out, on the basis of a decimation value m, every $m^{th}$ bit of the first bit sequence so as to obtain a first bit stream consisting of the bits of the first bit sequence picked out;
a second decimator configured to pick out, on the basis of a decimation value l, every $l^{th}$ bit of the second bit sequence so as to obtain a second bit stream consisting of the bits of the second bit sequence picked out;
a readjuster configured to readjust the decimation values m and l in response to a predetermined event such that m and l are different; and
a combiner configured to combine, in a bit-wise manner the first and second data streams so as to obtain the key bit stream; and
a decrypter configured to decrypt the encrypted data stream on the basis of the key bit stream.

25. The device as claimed in claim 24, wherein the combiner is configured to non-linearly combine, in a bitwise manner, the bits picked out by the first decimator and the second decimator.

26. A method of encrypting a data stream, comprising:
generating a bit sequence by means of a feedback shift register;
picking out, on the basis of a decimation value m, every $m^{th}$ bit of the bit sequence to obtain a key bit stream consisting of the bits picked out;
readjusting the decimation value m in response to a predetermined event; and
encrypting the data stream on the basis of the key bit stream,
wherein the feedback shift register is a linear feedback shift register which consists of N internal bit registers and has a characteristic of generating a bit sequence of a period duration of $2^N-1$, and the decimation value m is relatively prime with respect to the period duration so that during times the decimation value m remains constant between consecutive readjustments, the key bit stream is identical with a portion of an output bit sequence of a different linear feedback shift register being different from the feedback shift register of the device, also consisting of N internal bit registers, and also providing a period duration of 2N−1, but having a different characteristic.

27. A computer medium comprising a computer program with a program code for performing the method of decrypting an encrypted data stream, comprising:
generating a bit sequence by means of a feedback shift register;
picking out, on the basis of a decimation value m, every $m^{th}$ bit of the bit sequence so as to obtain a key bit stream consisting of the bits picked out; and
readjusting the decimation value m in response to a predetermined event;
decrypting the encrypted data stream on the basis of the key bit stream; and
providing a specific time indication, with the readjustment being performed in response to the specific time indication meeting a predetermined condition, wherein the decimation value m is readjusted several times with the feedback shift register running freely, without being reseeded, and the decryption being kept on therebetween, when the computer program runs on a computer.

28. A method of decrypting an encrypted data stream, comprising:
generating a bit sequence by means of a feedback shift register;
picking out, on the basis of a decimation value m, every $m^{th}$ bit of the bit sequence so as to obtain a key bit stream consisting of the bits picked out;
readjusting the decimation value m in response to a predetermined event;
decrypting the encrypted data stream on the basis of the key bit stream; and
providing a specific time indication, with the readjustment being performed in response to the specific time indication meeting a predetermined condition, wherein the decimation value m is readjusted several times with the feedback shift register running freely, without being re-seeded, and the decryption being kept on therebetween.

29. A device for encrypting a data stream, comprising:
a key bit stream generator configured to generate a key bit stream, comprising:
  a feedback shift register configured to generate a bit sequence;
  a decimator configured to pick out, on the basis of a decimation value m, every $m^{th}$ bit of the bit sequence so as to obtain the key bit stream consisting of the bits picked out; and
  a readjuster configured to readjust the decimation value m in response to a predetermined event;
an encrypter configured to encrypt the data stream on the basis of the key bit stream; and
a provider configured to provide a specific time indication, the readjuster being configured to perform the readjustment in response to the specific time indication meeting a predetermined condition, wherein the readjuster is configured to readjust the decimation value m several times with the feedback shift register running freely, without being re-seeded, and the encrypter keeping on the encryption therebetween.

30. The device as claimed in claim 29, wherein the feedback shift register is a linear feedback shift register.

31. The device as claimed in claim 30, wherein the linear feedback shift register consists of N internal bit registers and has a characteristic of generating a bit sequence of a period duration of $2^N-1$.

32. The device as claimed in claim 31, wherein the decimation value m is relatively prime with respect to the period duration so that during times the decimation value m remains constant between consecutive readjustments, the key bit stream is identical with a portion of an output bit sequence of a different linear feedback shift register being different from the feedback shift register of the device, also consisting of N internal bit registers, and also providing a period duration of $2^N-1$, but having a different characteristic.

33. A device for decrypting an encrypted data stream, comprising:
a key bit stream generator configured to generate a key bit stream, comprising:
  a feedback shift register configured to generate a bit sequence;
  a decimator configured to pick out, on the basis of a decimation value m, every $m^{th}$ bit of the bit sequence so as to obtain the key bit stream consisting of the bits picked out; and
  a readjuster configured to readjust the decimation value m in response to a predetermined event;
a decrypter configured to decrypt the encrypted data stream on the basis of the key bit stream; and
a provider configured to provide a specific time indication, the readjuster being configured to perform the readjustment in response to the specific time indication meeting a predetermined condition, wherein the readjuster is configured to readjust the decimation value m several times with the feedback shift register running freely, without being re-seeded, and the decrypter keeping on the decryption therebetween.

* * * * *